No. 821,048. PATENTED MAY 22, 1906.
H. F. MARRIOTT.
MEANS FOR SURVEYING BORE HOLES.
APPLICATION FILED AUG. 30, 1904.
4 SHEETS—SHEET 1.
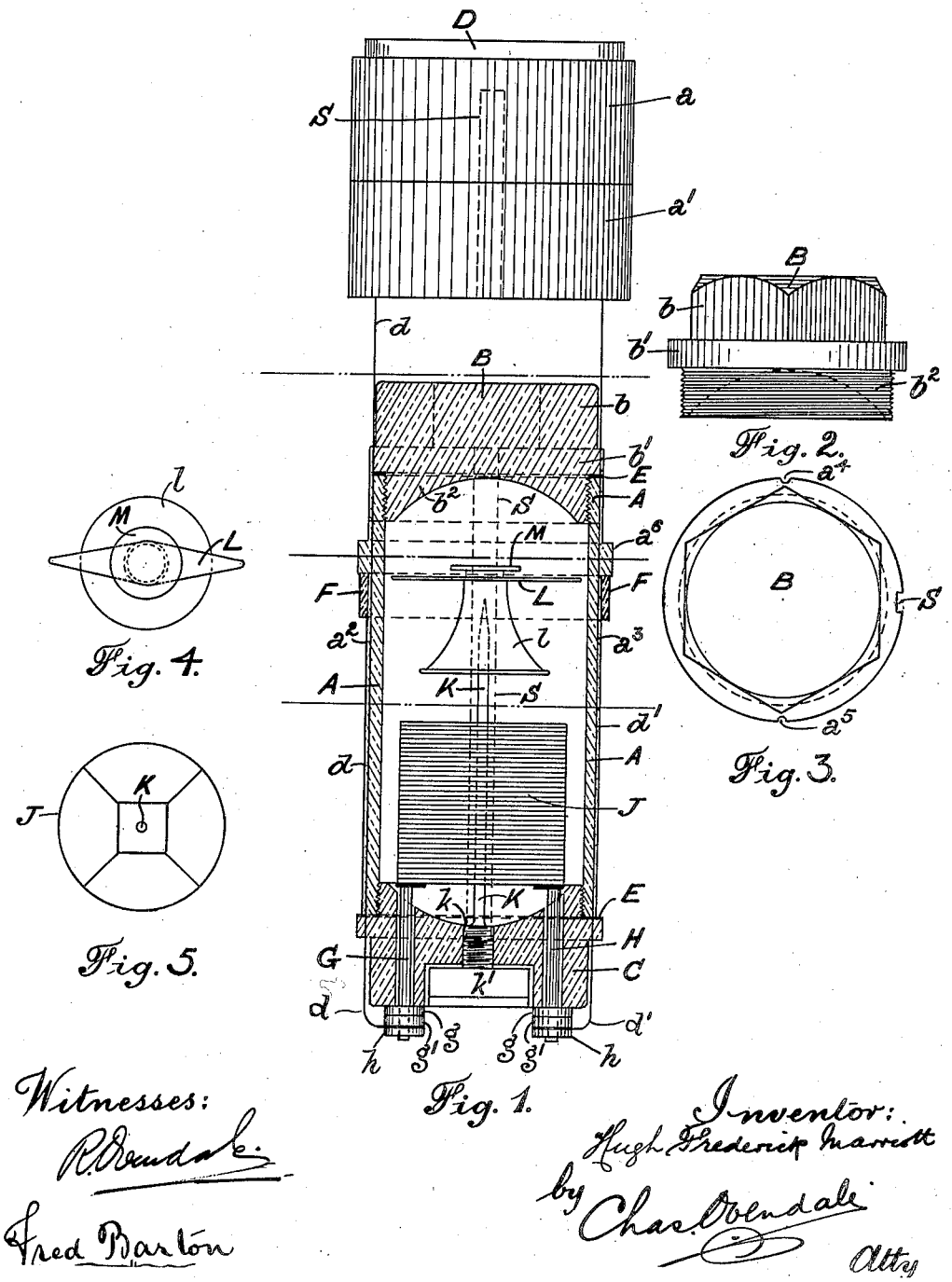

No. 821,048. PATENTED MAY 22, 1906.
H. F. MARRIOTT.
MEANS FOR SURVEYING BORE HOLES.
APPLICATION FILED AUG. 30, 1904.
4 SHEETS—SHEET 2.
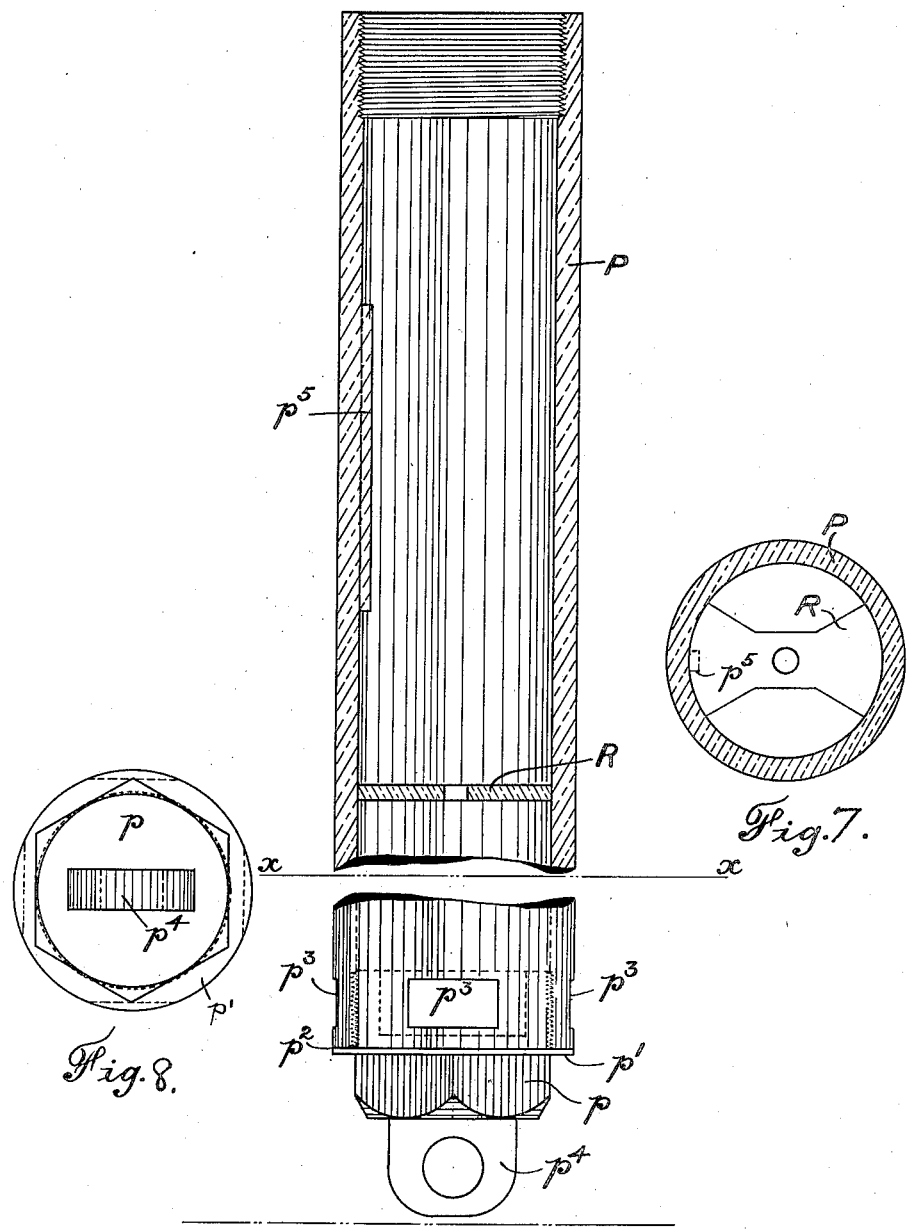

No. 821,048. PATENTED MAY 22, 1906.
H. F. MARRIOTT.
MEANS FOR SURVEYING BORE HOLES.
APPLICATION FILED AUG. 30, 1904.

4 SHEETS—SHEET 3.

Witnesses:
Ovendale
F. Ovendale

Inventor:
Hugh Frederick Marriott
by Chas. Ovendale
his Attorney

No. 821,048. PATENTED MAY 22, 1906.
H. F. MARRIOTT.
MEANS FOR SURVEYING BORE HOLES.
APPLICATION FILED AUG. 30, 1904.
4 SHEETS—SHEET 4.

Witnesses:

Inventor:
Hugh Frederick Marriott
by Chas Ovendale
his attorney

UNITED STATES PATENT OFFICE.

HUGH FREDERICK MARRIOTT, OF PARKTOWN, TRANSVAAL.

MEANS FOR SURVEYING BORE-HOLES.

No. 821,048. Specification of Letters Patent. Patented May 22, 1906.

Application filed August 30, 1904. Serial No. 222,777.

*To all whom it may concern:*

Be it known that I, HUGH FREDERICK MARRIOTT, residing in Parktown, near Johannesburg, Transvaal, have invented certain new and useful Improvements in Means for Surveying Bore-Holes, of which the following is a specification.

This invention relates to means for surveying bore-holes, and more particularly to an instrument for determining the direction of and measuring the amount of dip.

The instruments heretofore employed for the purposes specified have chiefly been designed to take indications or readings by means of liquids which solidify on cooling or solidify by time, and thereby fix the indicators in the positions which they assume at the point to be surveyed. These instruments have proved inadequate for obtaining accurate results, owing to the greater depths to which bore-holes are now made. The instruments in which liquids solidifying by cooling are employed have not proved satisfactory at depths exceeding one thousand feet or thereabout, owing to the extremely rapid cooling effect of the water in the bore-hole through which the instrument must pass in lowering it to the desired position. The instruments in which the liquids solidifying by time have been employed are a convenient method for obtaining the desired results; but a reliable liquid or solution suitable for the purpose has not been found. The use of liquids solidifying by time have hitherto proved too unreliable and erratic to be of much value.

Now the object of my invention is to produce an instrument in which electricity may be employed for obtaining the desired information; and my invention consists, essentially, in the use of electricity as a means for liquefying a solid for recording readings *in situ*. By this means I find that I eliminate all error while the instrument is in motion or being raised or lowered in the bore-hole to be surveyed.

The invention will now be described by aid of the accompanying drawings, wherein—

Figure 10:
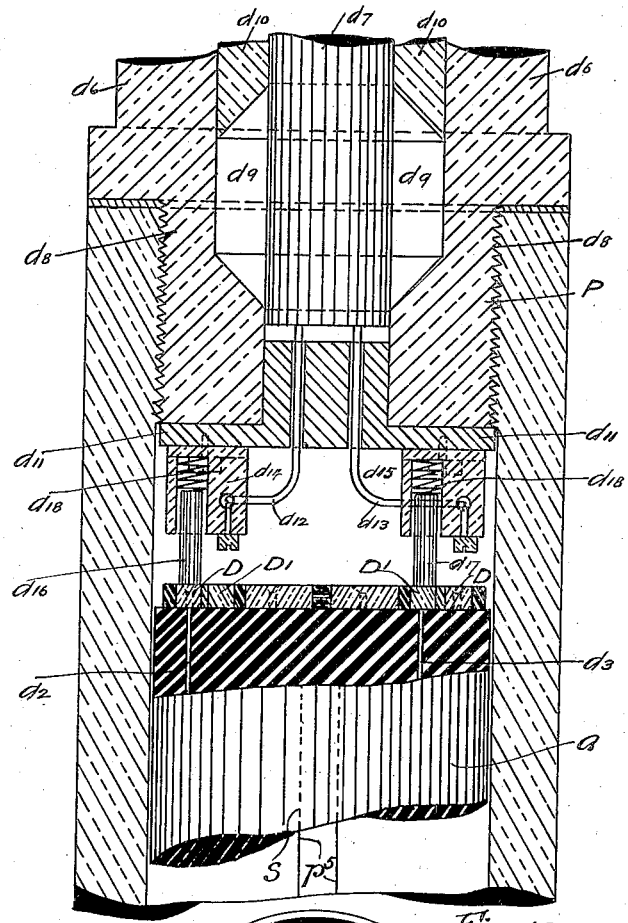
Figure 9:
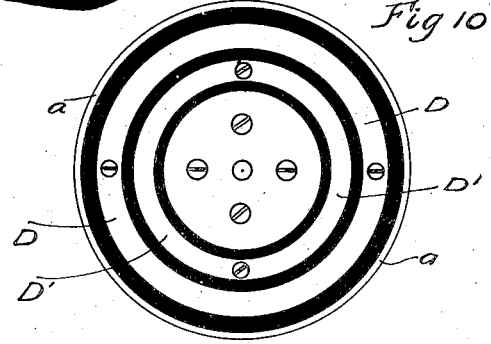
Figure 11:
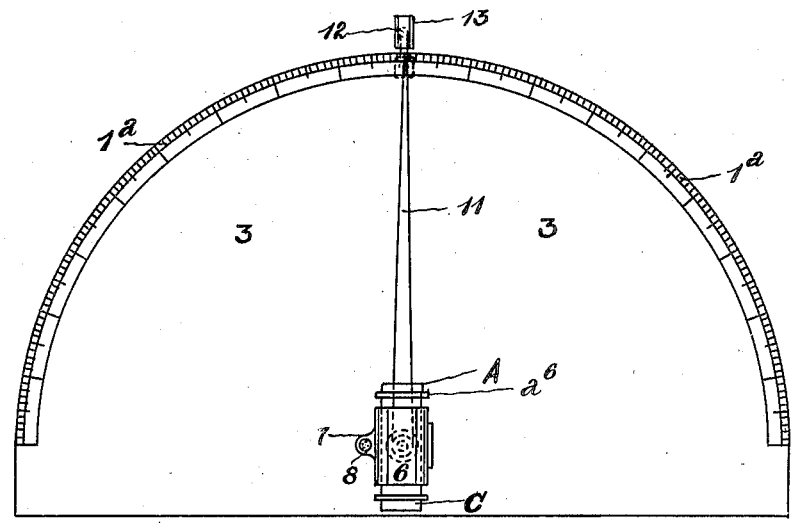
Figures 12, 13:
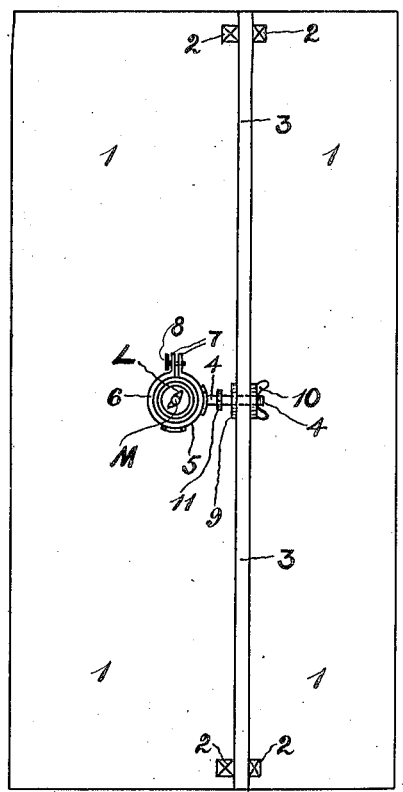

Figure 1 represents the instrument removed from its casing in part-sectional elevation. Fig. 2 is an elevation of the top screw cap or plug. Fig. 3 is a plan of Fig. 2. Fig. 4 is a plan of the magnetic compass and mirror detached. Fig. 5 is a plan of the resistance frame or coil, also detached. Fig. 6 is a part-sectional elevation of the tubular or cylindrical casing for the instrument. Fig. 7 is a transverse section on line $x\, x$, Fig. 8. Fig. 8 is a plan of the cap or plug for closing the lower end of the casing. Fig. 9 is a plan of Fig. 1; and Fig. 10 is a sectional elevation of a portion of the cable-head, showing the means whereby the electric current is passed through the instrument. Fig. 11 is an elevation of the device for reading the declination of the bore-hole from the mirror with the base-board removed. Fig. 12 is a plan, and Fig. 13 is a side elevation, also with the base-board removed.

Referring to Figs. 1 to 5, illustrative of the instrument, which are drawn to an enlarged scale, A represents a hollow cylinder or tubular vessel, which may be made of copper or any other suitable material, fitted at the upper end with the screw cap or plug B, which latter is shown in detail in Figs. 2 and 3. It comprises the upper hexagonal portion $b$, the central cylindrical part $b'$, and the externally-screwed lower portion $b^2$, which latter screws into the internally-screwed upper end of the tube A, as is shown in Fig. 1. In the other and lower end of the tube A is screwed another cap or plug C, similar in construction to the plug B. Between the flanges of the caps or plugs B C and the ends of the tube A washers E, of lead or other suitable material, may be arranged. The upper end of the tube A may be formed with an external annular projection or flange $a^6$, the diameter of which is slightly less than the internal diameter of the casing for the instrument, so that when the latter is placed in the former it serves to prevent lateral movement of the instrument inside the casing. Above the top cap or plug B are arranged two cylindrical pieces $a\, a'$, of ebonite or other suitable non-conducting material. On the top of the ebonite piece $a$ are secured two concentric rings D D', of brass or other suitable metal. To the ring D is attached the wire $d$, and to the other ring D' is connected the wire $d'$. The wires $d\, d'$ pass through holes $d^2\, d^3$, formed through the ebonite pieces $a\, a'$, and are electrically connected with the two rings D D' in any suitable manner. Electrical connection is made with the rings D D' by spring-contact pins $d^4\, d^5$ or other suitable means which serve for passing the current of electricity through the instrument.

In the construction shown in Fig. 10, $d^6$ represents the cable-head attached to the end of the cable $d^7$ and provided with a screw-thread $d^8$ for screwing it into the casing of the instrument. $d^9$ is a recess provided in the cable-head for the reception of packing to prevent the ingress of water into the instrument-casing, and $d^{10}$ is a ring which serves for pressing the packing tightly round the cable $d^7$. $d^{11}$ is a disk, of ebonite, shaped with a cylindrical boss to fit a hole in the end of the cable-head $d^6$. The conductors $d^{12}$ $d^{13}$ of the cable pass through the holes in the disk $d^{11}$ and are electrically connected with two blocks $d^{14}$ $d^{15}$ of suitable metal. These blocks $d^{14}$ $d^{15}$ are insulated from the cable-head $d^6$ and from each other by the ebonite disk $d^{11}$. In holes or recesses in the blocks $d^{14}$ $d^{15}$ are arranged the spring-contacts or pins $d^{16}$ $d^{17}$, which are electrically connected with the conductors $d^{12}$ $d^{13}$ through the blocks $d^{14}$ $d^{15}$. In the bottoms of the holes or recesses in the blocks $d^{14}$ $d^{15}$ are located spiral springs $d^{18}$, which by exerting pressure on the inner ends of the contact-pins $d^{16}$ $d^{17}$ make electrical connection with the rings D D' when the cable-head $d^6$ is screwed into the instrument-casing, as is clearly illustrated in Fig. 10 of the drawings.

In the exterior of the tube A and diametrically opposite each other are formed two longitudinal and vertical grooves $a^2$ $a^3$, in which the wires $d$ $d'$ are located. Grooves $a^4$ $a^5$ (see Fig. 3) are formed in the flanges of each of the caps or plugs B C, which grooves are brought into coincidence with the longitudinal grooves $a^2$ $a^3$ in the tube A, so that the wires $d$ $d'$ lie in the grooves and are thereby removed from the surface or circumference of the tube A and plugs B C. The wires $d$ $d'$ are insulated from the tube A and the two plugs B C.

Surrounding the tube A below the annular projection $a^6$ is secured a ring F, which serves for keeping the wires $d$ $d'$ in position in the grooves $a^2$ $a^3$ in the tube A.

Located in holes formed through the cap or plug C are two terminals G H, which are insulated from the plug C. On the outer ends of each of the terminals G H and next the plug C is arranged a washer $g$, of insulating material. Next the washer $g$ is screwed a nut $g'$. The one wire $d$ is connected with the terminal G, and the other wire $d'$ is connected to the other terminal H.

$h$ represents nuts screwed over the lower extremities of the pins or terminals G H, which serve for making contact between the terminals G H and the wires $d$ $d'$ or for retaining the contacts in position.

Arranged in the lower portion of the tube A is a resistance frame or coil or spiral wire J. To this resistance-frame J are attached the terminals G H.

To the bottom cap or plug C is rigidly affixed a vertically-disposed needle K, which projects through the resistance-frame J into the upper portion of the tube A. The needle K is formed with a screw-thread which screws through a hole $k$, tapped through the center of the bottom cap or plug C. On the outer extremity of the needle K is formed or fitted a nut or head $k'$, which serves for screwing the needle K through the cap or plug C when assembling the parts of the instrument. Balanced on the point of the needle K is a magnetic compass L. The compass L is affixed to a conical or bell-shaped base $l$, which is made hollow on the under side and into which projects the upper end of the needle K. Fixed to the top of the compass L in a horizontal position is a small silver mirror M, which serves for determining the direction of dip of the bore-hole.

In Figs. 8, 9, and 10, which are drawn full size, I illustrate the cylindrical casing for the instrument. (Illustrated in Figs. 1 to 5.) This casing P consists of a hardened gun-metal or other suitable tubing made sufficiently thick to effectually withstand the greatest pressure to which it is likely to be subjected. In the lower end of the casing P is screwed a plug $p$, which serves for closing the lower end of the casing. To prevent the ingress of water, a flange $p'$ may be formed on the plug $p$, between which and the lower end of the casing P a washer $p^2$, of lead or other suitable material, is preferably placed. The lower end of the casing P may be formed with flat surfaces $p^3$ for holding the casing by means of a spanner while screwing in the plug $p$. The plug $p$ is formed with an eyepiece $p^4$ to allow of a weight being attached to the casing, if desired, or any other instrument or attachment. The casing P is constructed with a longitudinal feather or projection $p^5$, and in proximity to its lower end it is formed or fitted with a diaphragm R. The upper end of the casing P is provided with an internal screw-thread which serves as the means for attaching the piece or connection carrying the spring-contacts which make contact with the concentric rings D. (See Fig. 1.)

The tube A, the screw caps or plugs B C, and the ebonite pieces $a$ $a'$ are formed with a vertical groove S, (see Figs. 1 and 3,) into which the feather $p^5$ projects to retain the instrument in position in the casing P. The instrument is lowered in the casing P until the bottom cap or plug C rests upon the diaphragm R, by which it is supported.

After the magnetic compass L has been arranged in position on the needle K, which forms the pivot, molten paraffin-wax or other suitable material is then poured into the tube until the lower portion of the compass attachment is well below the surface. The wax is then allowed to solidify, the top cap or plug B screwed into position, and the instrument then placed in the casing P and the wires $d$ $d'$ connected, by means of the electric cable, with a source of supply of electrical energy. In use the instrument is lowered in the bore-hole to the position required to be surveyed. A sufficiently strong current of electricity is then passed through the resistance-frame or spiral wire J for a sufficient length of time to melt or liquefy the mass of paraffin-wax or other material in the tube A. The current is then cut off, whereupon the compass L assumes its true magnetic north and south positions. The wax is then allowed to cool and resolidify, after which the instrument is withdrawn from the bore-hole. The direction of dip may then be ascertained by observing the declination of the silver mirror M from the horizontal with regard to the direction of the compass L. The mirror M being attached to the compass, two directions—true north and south—are known or readily determinable. From these points or directions the declination of the mirror from the horizontal (a plane at right angles to the longitudinal axis of the tube A or casing P) represents the direction of and measures the dip, which can be easily determined.

In Figs 11, 12, and 13, illustrating the arrangement for determining from the mirror the declination of the bore-hole, 1 represents a horizontal board which has fixed to it at two opposite ends two uprights or supports 2, which support a vertical board 3, formed with a semicircular upper edge 1ª marked with degrees like a protractor. At the center of the protractor 3 and in proximity to the bottom edge is fixed a clamping device consisting of a spindle 4, carrying one half 5 of a clamp, in which the instrument consisting of the compass-needle L, mirror M, &c., in its holder is clamped by means of the other half 6 of the clamp. The instrument is placed with the magnetic needle L and mirror M at the top. The halves 5 6 of the clamp are constructed with lugs 7, through which is screwed a tightening-screw 8 for securing the instrument. 9 is a washer placed on the spindle 4 at one side of the vertical board 3, and 10 a wing-nut screwed onto the threaded extremity of the spindle 4 at the other side of the board 3. The wing-nut 10 serves for clamping the clamp and instrument to the protractor after it has been set. On the spindle 4 at the front of the board 3 is fixed a pointer 11, which rotates with the spindle 4 and serves for determining the number of degrees of dip or declination of the bore-holes. To the top of the board 3 at the center or immediately above the hole provided for the clamp-spindle 4 is a bracket 12, which is bent over to the front of the protractor. To the outer extremity of the bracket 12 is fixed a tubular eyepiece 13, to the inside of which are fixed cross-wires, the point of intersection of which coincides with the center of the clamp 5 6 when the pointer 11 is vertical. In using this device the instrument having been removed from its casing is then placed and fixed in the clamp 5 6 and the pointer 11 placed perpendicular. The operator then looks through the eyepiece 13 and moves the pointer 11 until the reflection of the eye is seen through the eyepiece 13 in the center of the mirror M. The mirror is then horizontal, and when in this position the pointer 11 indicates on the protractor 3, in degrees read from the vertical, the declination of the hole.

What I claim as my invention, and desire to protect by Letters Patent, is—

1. In an instrument for surveying boreholes, means for determining the direction and measuring the amount of dip and means for liquefying a solid for recording the indications or readings *in situ* by the passage of a current of electricity through the instrument.

2. An instrument for surveying bore-holes, comprising a vessel, a magnetic compass therein and a solid substance in said vessel which is liquefiable by a current of electricity passed through the instrument so that on resolidification the magnetic compass is thereby retained in the position it assumes at the point to be surveyed, substantially as described.

3. An instrument for surveying bore-holes, comprising a casing, a magnetic compass therein, a resistance frame or coil and a quantity of material which is liquefiable by a current of electricity passed through the instrument to allow the magnetic compass to assume its true magnetic north and south positions at the point to be surveyed in the borehole, which material on resolidification retains the magnetic compass in such position, substantially as described.

4. In an instrument for surveying boreholes, in combination, a vessel fitted with a plug at each end, the lower plug carrying a needle supporting a magnetic compass formed with a conical or bell-shaped lower portion and carrying a mirror, a resistance frame or coil arranged inside the vessel, a substance or material placed in the vessel which substance or material is liquefied on the passage of a current of electricity through the resistance-coil, substantially as described.

5. An instrument for surveying bore-holes, comprising in combination, a vessel fitted with plugs or caps at each end, the bottom plug carrying the terminals connected with the electrical wires or conductors and supporting a vertically-arranged needle which carries at its upper end a magnetic compass formed with a conical or bell-shaped base and fitted with a mirror, a resistance frame or coil located in the vessel connected with the terminals, a substance or material placed in the vessel, which substance or material is liquefied on the passage of a current of electricity through the resistance-coil and wires or conductors for passing the electric current through the instrument, substantially as described.

6. In an instrument for surveying boreholes the combination of a magnetic compass constructed with a bell-shaped base, a vertical needle on the extremity of which said compass-base is supported, a mirror carried by the compass, a resistance-coil below the compass, a substance surrounding said coil which substance is liquefiable by the passage of a current of electricity through the coil, said substance serving on resolidification to retain the compass in the position it assumes when the substance is liquefied at the point to be surveyed, wires or conductors for passing a current of electricity through the coil, and a casing for inclosing the several parts of the instrument constructed with a longitudinal feather or projection and fitted with a diaphragm for supporting the instrument in the casing, substantially as described.

In witness whereof I have hereunto set my hand in the presence of two subscribing witnesses.

HUGH FREDERICK MARRIOTT.

Witnesses:
    CHAS. OVENDALE,
    R. OVENDALE.